United States Patent [19]

Schandl et al.

[11] Patent Number: 6,078,480
[45] Date of Patent: Jun. 20, 2000

[54] SYSTEM FOR RECORDING AND/OR REPRODUCING INFORMATION SIGNALS, AS WELL AS CASSETTE AND APPARATUS FOR THE SYSTEM

[75] Inventors: Hartmut Schandl, Vienna; Dietfried Süss, Herzogenburg, both of Austria; Albert M. A. Rijckaert, Aalst, Netherlands

[73] Assignee: U.S. Philips Corporation, New York, N.Y.

[21] Appl. No.: 08/391,379

[22] Filed: Feb. 17, 1995

Related U.S. Application Data

[63] Continuation of application No. 08/088,468, Jul. 7, 1993, abandoned.

[30] Foreign Application Priority Data

Jul. 10, 1992 [AT] Austria ................................. 1417/92
Nov. 27, 1992 [AT] Austria ................................. 2354/92

[51] Int. Cl.[7] .................................................. G11B 23/30
[52] U.S. Cl. ............................................................. 360/132
[58] Field of Search .................................. 360/137, 132, 360/134, 135, 133, 96.5; 369/291

[56] References Cited

U.S. PATENT DOCUMENTS

| | | | |
|---|---|---|---|
| 4,383,285 | 5/1983 | Staar | 360/137 |
| 5,016,123 | 5/1991 | Karsh | 360/132 |
| 5,434,721 | 7/1995 | Sawada et al. | 360/132 |

FOREIGN PATENT DOCUMENTS

| | | | |
|---|---|---|---|
| 356916 | 10/1979 | Austria . | |
| 0265167 | 4/1988 | European Pat. Off. . | |
| 0373718 | 6/1990 | European Pat. Off. . | |
| 4200436 | 7/1993 | Germany | 360/137 |
| 60-231989 | 11/1985 | Japan . | |
| 62-73479 | 4/1987 | Japan . | |
| 63-13187 | 1/1988 | Japan . | |
| 63-206953 | 8/1988 | Japan | 369/291 |
| 2-201789 | 8/1990 | Japan . | |

OTHER PUBLICATIONS

A. Sedra et al, *Microelectronic Circuits,* 1987 (2nd Ed.) pp. 31–32, pp. A1–A13.

*Primary Examiner*—Jefferson Evans

[57] ABSTRACT

In a system (1) for recording and/or reproducing information signals on/from at least one record carrier (13), which system comprises an apparatus (2) and at least one cassette (3) for use in the apparatus (2), each cassette (3) comprises at least one indicator which by means of one of its parameters indicates at least one characteristic value of an element of the cassette (3), and the apparatus (2) comprises a detection device (97, 101, 78) for the detection of this indicator parameter. At least one electrical impedance (R5, R6) is arranged in a cassette (3) as an indicator of a cassette (3), the impedance value of this impedance defining the parameter for the indication of a characteristic value, and the detection device (97, 101, 78) being adapted to directly or indirectly detect the parameter defined by the impedance value of the at least one impedance (R5, R6).

34 Claims, 4 Drawing Sheets

| L | d | R1 | R2 | VE |
|---|---|---|---|---|
| L1 | d1<br>d2<br>d3 | (R1)1 | (R2)1<br>(R2)2<br>(R2)3 | (VE)1<br>(VE)2<br>(VE)3 |
| L2 | d1<br>d2<br>d3 | (R1)2 | (R2)1<br>(R2)2<br>(R2)3 | (VE)4<br>(VE)5<br>(VE)6 |
| L3 | d1<br>d2<br>d3 | (R1)3 | (R2)1<br>(R2)2<br>(R2)3 | (VE)7<br>(VE)8<br>(VE)9 |

VE1 < VE2 < VE3 < VE4 < VE5 < VE6 < VE7 < VE8 < VE9  FIG.5

SYSTEM FOR RECORDING AND/OR REPRODUCING INFORMATION SIGNALS, AS WELL AS CASSETTE AND APPARATUS FOR THE SYSTEM

This is a continuation of application Ser. No. 08/088,468, filed on Jul. 7, 1993 now abandoned.

BACKGROUND OF THE INVENTION

The invention relates to a system for recording and/or reproducing information signals on/from at least one record carrier, which system comprises an apparatus having a device for recording and/or reproducing the information signals on/from a record carrier and at least one cassette adapted to be inserted into the apparatus, which cassette accommodates a record carrier and comprises at least one indicator which by means of one of its parameters indicates at least one characteristic value of an element of the cassette, the apparatus comprising at least one detection device for the detection of the parameter of the indicator, which parameter indicates the at least one characteristic value.

The invention also relates to a cassette for such a system, which cassette accommodates a record carrier and which comprises at least one indicator which by means of one of its parameters indicates at least one characteristic value of an element of the cassette.

The invention further relates to an apparatus for such a system, which apparatus comprises a device for recording and/or reproducing the information signals and into which a cassette can be inserted, which cassette comprises at least one indicator which by means of one of its parameters indicates at least one characteristic value of an element of said cassette, and which comprises at a detection device for the detection of the parameter of the indicator, which parameter indicates the at least one characteristic value.

A system of the type defined in the opening paragraph is known, for example, from AT 356 916 B. In this known system, which is a magnetic-tape system, each cassette of the system has blind-hole-like recesses in the housing of the cassette, in which break-out tabs are arranged as indicators to indicate the total storage capacity or total tape length. By breaking out a tab the depth of the relevant recess from the which the tab has been removed can be changed, which means that two different values can be selected for the depth of the recesses. In the known system the depth of the recesses represents the parameter indicating a characteristic value of the magnet tape accommodated in a cassette, i.e. the total storage capacity or the total tape length. As each cassette in the known system has three such recesses it is achieved that the characteristic value of the magnetic tape in this cassette can be assigned to a combination of two different values of the depth of each of the three recesses, thereby enabling eight different gradations of the characteristic value of the magnetic tape to be indicated. Since particularly a cassette of minimal dimensions has hardly any room for a larger number of such recesses the available number of recesses is comparatively small particularly for small cassettes, which has the drawback that only a comparatively small number of gradations of the characteristic value of the magnetic tape in a cassette can be indicated. In an apparatus of the known system the detection device for detecting the parameters of the indicators, i.e. the depth of the recesses, indicating the characteristic value of a magnetic tape, is of electromechanical construction. The detection device basically comprises three spring-loaded pins which at one end sense the depth of the recesses and at the other end cooperate with electrical switches capable of being actuated depending on the depth of the recesses. Such a detection device is very expensive and is of comparatively intricate construction, which is also considered to be a drawback.

SUMMARY OF THE INVENTION

It is an object of the invention to preclude the above problems and to improve a system of the type defined in the opening paragraph in such a manner that even in the case of small dimensions of a cassette of the system it is possible to indicate both a large number of gradations of a characteristic value of an element of such a cassette of the system and a plurality of such characteristic values in a multiplicity of gradations, the cassette yet being of simple and comparatively cheap construction, and that the detection device of an apparatus of the system is of a simple construction without any mechanical parts susceptible to wear and breakdown. To this end the invention is characterized in that there is provided at least one electrical impedance in the cassette as an indicator of said cassette, the impedance value of said impedance defining the parameter for the indication of at least one characteristic value of an element of said cassette, and the detection device of the apparatus is adapted to detect directly or indirectly the parameter defined by the impedance value of the at least one impedance. Thus, it is achieved that by the provision of electrical impedances having different impedance values it is possible to indicate a multiplicity of gradations of one or more characteristic values of at least one element of a cassette in a simple manner and without being confronted with space problems, and that the detection device in an apparatus is of simple construction and comprises only electrical circuit elements, which is advantageous for a high reliability, a cheap construction and a low susceptibility to breakdown.

The electrical impedance may be, for example, a capacitor whose capacitance value serves as a parameter to indicate a characteristic value and which is, for example, combined with a coupling coil to form an electrical resonant circuit, which coupling coil in a cassette of the system can inductively cooperate with a further coupling coil in an apparatus of the system. The capacitor in conjunction with the two coupling coils can form the frequency-determining part of a frequency generator whose, for example, sinusoidal output signal, whose frequency depends on the capacitance of the capacitor, can be applied to a frequency detection device of the apparatus, which depending on the detected frequency generates a characteristic value of an element of this cassette indicated by the capacitance of the capacitor. However, it is found to be particularly advantageous if the at least one electrical impedance provided as an indicator of a cassette is connected to electrically conductive contacts of a contact set of the cassette, which contacts are accessible from outside the cassette, and the apparatus comprises electrically conductive complementary contacts of a complementary contact set of the apparatus, which complementary contacts can be brought into contact with the contacts of the cassette, at least one of said complementary contacts being connected to the detection device of the apparatus to connect the detection device of the apparatus to the at least one indicator impedance of a cassette inserted in the apparatus. This is advantageous in view of a simple and reliable electrical connection between the detection device in an apparatus of the system and the at least one impedance in a cassette of the system, a further advantage being that the electrical signal transmission between the apparatus and a cassette has no adverse effects on the record carrier in the cassette.

It is then also found to be particularly advantageous if there is provided at least one ohmic resistor as an indicator of a cassette, the ohmic resistance value of said resistor defining the parameter for the indication of at least one characteristic value of an element of said cassette. An advantage of this is that a particularly cheap construction is possible and also that direct voltage detection of the indicating parameter is possible.

In this respect it is also found to be advantageous if a cassette comprises two ohmic resistors as indicators, which are interconnected in a node connected to a contact and which are each connected to a further contact, and the detection device of the apparatus is connected to a complementary contact which can be brought into contact with the contact connected to the node between the two resistors. This provides a large number of indication possibilities in conjunction with a minimal number of contacts for access to the resistors serving as indicators.

In this respect it is further found to be advantageous if there is provided a voltage divider formed by two ohmic resistors as an indicator of a cassette, the dividing ratio of said voltage divider, which is defined by the resistance values of the two resistors being the parameter for the indication of at least one characteristic value of an element of the cassette and the tap of said voltage divider being connected to a contact of the cassette, and the detection device of the apparatus is connected to a complementary contact which can be brought into contact with the contact connected to the tap and is adapted to detect the voltage appearing on the tap of the voltage divider and determined by the dividing ratio of the voltage divider. This enables a simple amplitude detector to be used as a detection device adapted to detect direct voltages.

In this respect it is also found to be advantageous if there is provided as a further indicator of a cassette a further voltage divider formed by two ohmic resistors arranged in parallel with the one voltage divider, the dividing ratio of said further voltage divider, which is defined by the resistance values of the two further resistors being the parameter for the indication of at least one characteristic value of an element of the cassette and the tap of said further voltage divider being connected to a further contact of the cassette, and the detection device of the apparatus is connected to a further complementary contact which can be brought into contact with the further contact connected to the tap and is adapted to detect the voltage appearing on the tap of the further voltage divider and determined by the dividing ratio of the further voltage divider. This is a simple manner of increasing the number of indication possibilities in comparison with a cassette comprising only one voltage divider as an indicator.

It is also found to be advantageous if the at least one impedance provided as an indicator of a cassette is mounted in the cassette so as to be removable therefrom and alternatively a solid-state memory can be mounted in the cassette, which solid-state memory has terminals which can also be connected to contacts of the contact set of the cassette, and in the apparatus there may be provided a write and read device for writing into and reading out the solid-state memory, which write and read device can be connected to complementary contacts of the complementary contact set for connection of the write and read device to the solid-state memory of a cassette inserted in the apparatus. Thus, it is achieved that, if desired, the at least one impedance provided as an indicator in a cassette in accordance with the invention can be replaced by a solid-state memory and that the contact set provided for electrically connecting the at least one impedance is also used for the electrical connection of the solid-state memory and the complementary contact set provided for electrically connecting the detection device is also used for the electrical connection of the write and read device.

Moreover, it is found to be advantageous if in addition to the at least one impedance provided in the cassette as an indicator a solid-state memory is mounted in the cassette and has terminals which can also be connected to contacts of the contact set of the cassette, and in the apparatus there is provided a write and read device for writing into and reading out the solid-state memory, which write and read device can be connected to complementary contacts of the complementary contact set for connection of the write and read device to the solid-state memory of a cassette inserted in the apparatus. This always guarantees a simple indication of at least one characteristic value of an element of the cassette with the at least one impedance accommodated in the cassette and at the same time an additional storage in the solid-state memory of further data relating to the cassette, the contact set provided for electrically connecting the at least one impedance being also used for the electrical connection of the solid-state memory and the complementary contact set provided for electrically connecting the detection device being also used for the electrical connection of the write and read device.

In this respect it is also found to be advantageous if a cassette of the system has a contact set comprising four contacts and an apparatus of the system has a complementary contact set comprising four complementary contacts, of which two complementary contacts and two contacts which can be brought into contact with the last-mentioned complementary contacts are arranged to transfer supply potentials, and two further complementary contacts, which are connected to the write and read device via two lines, and two further contacts, which can be brought into contact with said further complementary contacts, are arranged to transfer data signals and clock signals from the write and read device of the apparatus to the solid-state memory in the cassette, at least one impedance provided as an indicator is arranged between at least one contact for the transfer of a supply potential and a further contact for the transfer of data or clock signals, and a switching device is arranged in at least one of the two lines leading from the write and read device to the further complementary contacts for the transfer of data and clock signals, via which switching device the impedance provided as an indicator can be connected to the detection device of the apparatus. This is particularly advantageous in view of a minimal number of contacts and complementary contacts and a large number of indication possibilities owing to the independent detection possibility of the impedance value of an impedance provided as an indicator.

It is also found to be advantageous if the at least one impedance provided as an indicator of a cassette is arranged to indicate the total storage capacity of the record carrier accommodated in said cassette.

It is also found to be advantageous if the at least one impedance provided as an indicator of a cassette is arranged to indicate the thickness of the record carrier accommodated in said cassette.

It is also found to be advantageous if the at least one impedance provided as an indicator of a cassette is arranged to indicate the speed of transport allocated to the record carrier in said cassette relative to the device for recording and/or reproducing information signals of the apparatus.

It is also found to be advantageous if the at least one impedance provided as an indicator of a cassette is arranged to indicate the recording characteristics of the record carrier accommodated in said cassette.

According to the invention a cassette for a system in accordance with the invention is characterized in that there is provided at least one electrical impedance as an indicator of the cassette, the impedance value of said impedance defining the parameter for the indication of at least one characteristic value of an element of said cassette. Such a cassette in accordance with the invention has the advantage that by the provision of several impedances of different impedance values it is possible to indicate a large number of gradations of a characteristic value of an element of the cassette or several characteristic values of one or more elements of the cassette in a multiplicity of gradations without with this leading to space problems to arrange the relevant indicators on such a cassette.

In this respect it is found to be particularly advantageous if the at least one electrical impedance provided as an indicator of the cassette is connected to electrically conductive contacts of a contact set of the cassette, which contacts are accessible from outside the cassette. Such a cassette enables a signal transmission without any adverse effects on the record carrier in the cassette.

Moreover, it is found to be particularly advantageous if there is provided at least one ohmic resistor as an indicator of the cassette, the ohmic resistance value of said resistor defining the parameter for the indication of at least one characteristic value of an element of said cassette. This results in a very cheap construction and has the advantage that direct-voltage detection of the indicating parameter is possible.

In this respect it is found to be particularly advantageous if a cassette comprises two ohmic resistors as indicators, which are interconnected in a node connected to a contact and which are each connected to a further contact. This provides a large number of indication possibilities in conjunction with a minimal number of contacts for access to the resistors serving as indicators.

It is also found to be advantageous if there is provided a voltage divider formed by two ohmic resistors as an indicator of the cassette, the dividing ratio of said voltage divider, which is defined by the resistance values of the two resistors, being the parameter for the indication of at least one characteristic value of an element of the cassette and the tap of said voltage divider being connected to a contact arranged to connect the tap of the voltage divider to a detection device adapted to detect the voltage appearing on the tap of the voltage divider and determined by the dividing ratio of the voltage divider. This enables the indicating parameter, i.e. the dividing ratio of the voltage divider, to be detected by means of a simple amplitude detector adapted to detect direct voltages.

Moreover, it is found to be particularly advantageous if there is provided as a further indicator of a cassette a further voltage divider formed by two ohmic resistors arranged in parallel with the one voltage divider, the dividing ratio of said further voltage divider, which is defined by the resistance values of the two further resistors being the parameter for the indication of at least one characteristic value of an element of the cassette and the tap of said further voltage divider being connected to a contact of the cassette arranged to connect the tap of the further voltage divider to a detection device adapted to detect the voltage appearing on the tap of the further voltage divider and determined by the dividing ratio of the further voltage divider. This is a simple manner of increasing the number of indication possibilities in comparison with a cassette comprising only one voltage divider as an indicator.

Moreover, it is found to be particularly advantageous if the at least one impedance provided as an indicator of the cassette is mounted in the cassette so as to be removable therefrom and alternatively a solid-state memory can be mounted in the cassette, which solid-state memory has terminals which can also be connected to contacts of the contact set of the cassette. If desired, this enables the at least one impedance to be replaced by a solid-state memory in a comparatively simple manner, the contact set of the cassette being also used for the connection of the solid-state memory.

Moreover, it is found to be particularly advantageous if in addition to the at least one impedance provided in the cassette as an indicator a solid-state memory is mounted in the cassette and has terminals which are also connected to contacts of the contact set of the cassette. Thus, a cassette always allows both a simple indication of at least one of its characteristic values and the additional storage of further data relating to the cassette, both the at least one indication impedance and the solid-state memory being accessible via the same contact set.

In this respect it is found to be particularly advantageous if the cassette has a contact set comprising four contacts, of which two contacts are arranged to transfer supply potentials and two further contacts are arranged to transfer data signals and clock signals to the solid-state memory in the cassette, and at least one impedance provided as an indicator is arranged between at least one contact for the transfer of a supply potential and a further contact for the transfer of data or clock signals. Such a cassette excels in that it has a minimal number of contacts and provides a large number of indication possibilities owing to the independent detection possibility of the impedance value of an impedance provided as an indicator.

It is also found to be particularly advantageous if the at least one impedance provided as an indicator of the cassette is arranged to indicate the total storage capacity of the record carrier accommodated in said cassette.

It is also found to be particularly advantageous if the at least one impedance provided as an indicator of the cassette is arranged to indicate the thickness of the record carrier accommodated in said cassette.

It is also found to be particularly advantageous if the at least one impedance provided as an indicator of the cassette is arranged to indicate the speed of transport allocated to the record carrier in said cassette relative to a device provided in the apparatus to record and/or reproduce information signals of the apparatus.

It is also found to be particularly advantageous if the at least one impedance provided as an indicator of the cassette is arranged to indicate the recording characteristics of the record carrier accommodated in said cassette.

According to the invention an apparatus for a system in accordance with the invention is characterized in that the detection device of the apparatus is adapted to detect directly or indirectly the parameter defined by the impedance value of the at least one impedance provided as an indicator of a cassette adapted to be inserted into the apparatus. This achieved enables the use of a particularly simple detection device for detecting the parameter defined by the impedance value of at least one impedance provided as an indicator, which detection device comprises only electrical circuit parts, which is advantageous for a high reliability, a low susceptibility to defects and a substantially complete freedom from wear.

In this respect it is found to be particularly advantageous if the apparatus comprises a plurality of electrically conductive complementary contacts of a complementary contact set of the apparatus, which complementary contact set is adapted to cooperate and establish contact with a contact set of a cassette adapted to be inserted into the apparatus, which contact set comprises contacts, at least one of said complementary contacts being connected to the detection device of the apparatus. This allows a signal transmission substantially without any influence being exerted on field-sensitive parts of the apparatus and on the record carrier in the cassette which has been loaded into the apparatus.

It is also found to be particularly advantageous if the detection device comprises an operational amplifier between whose output and whose inverting input an ohmic feedback resistor is arranged and to whose inverting input at least one ohmic resistor can be connected, which resistor has been provided as an indicator of a cassette adapted to be inserted into the apparatus. This is advantageous for a very accurate direct-voltage detection of an indicating parameter.

In this respect it is found to be particularly advantageous if the non-inverting input of the one operational amplifier of the detection device is connected to the output of a switching device having two inputs, and a potential can be applied to one input of the switching device, which potential has a value in the range of a potential which can be applied to an ohmic resistor provided as an indicator in a cassette, and another potential can be applied to the other input of the switching device, which other potential has a value in the range of another potential which can be applied to another ohmic resistor provided as an indicator in a cassette. This is particularly advantageous for switching very simply between two detection processes by means of which the resistance values of two resistors provided as indicators are detected independently of one another.

In this respect it is also found to be particularly advantageous if in order to compensate for the offset voltage produced on the output of the one operational amplifier as a result of the change-over of the potential on the non-inverting input of the one operational amplifier a further operational amplifier of the detection device is connected to the output of the one operational amplifier and has its non-inverting input connected to the non-inverting input of the one operational amplifier and to the output of the switching device. This ensures that the output voltage of the further operational amplifier remains within a voltage range which is as narrow as possible.

In this respect it is further found to be particularly advantageous if a d.c. reference voltage source is connected to the non-inverting input of the further operational amplifier of the detection device and supplies a d.c. reference voltage to adjust the d.c. level on the output of the further operational amplifier. In this way the voltage range of the output voltage to be detected of the further operational amplifier can be adapted simply to specific requirements or situations.

It is also found to be particularly advantageous if a voltage detector is connected to the output of the further operational amplifier of the detection device for the detection of the output voltage of the further operational amplifier. This is advantageous in order to obtain a very simple construction.

Moreover, it is found to be particularly advantageous if the apparatus has a complementary contact set comprising four complementary contacts, of which two complementary contacts are arranged to transfer supply potentials, and two further complementary contacts, which are connected to a write and read device of the apparatus via two lines, are arranged to transfer data signals and clock signals from the write and read device of the apparatus to a solid-state memory provided in a cassette adapted to be inserted into the apparatus, and a switching device is arranged in at least one of the two lines leading from the write and read device to the further complementary contacts for the transfer of data and clock signals, via which switching device the impedance provided as an indicator in a cassette adapted to be inserted into the apparatus can be connected to the detection device of the apparatus. This makes it possible to minimize the number of complementary contacts in an apparatus which is adapted to indicate indicators of the cassette and to communicate with a solid-state memory of the cassette.

BRIEF DESCRIPTION OF THE DRAWINGS

The invention will now be described in more detail with reference to the drawings, which show some exemplary embodiments to which the invention is not limited. FIG. 5 is a Table listing the two characteristic values of a cassette of the system shown in FIG. 4, the associated resistance values of the two resistors of the voltage divider provided as an indicator in a cassette of the system shown in FIG. 4, and the values of the voltages appearing on the tap of the voltage divider formed by the two resistors.

DETAILED DESCRIPTION OF THE PREFERRED EMBODIMENTS

Figure 1:
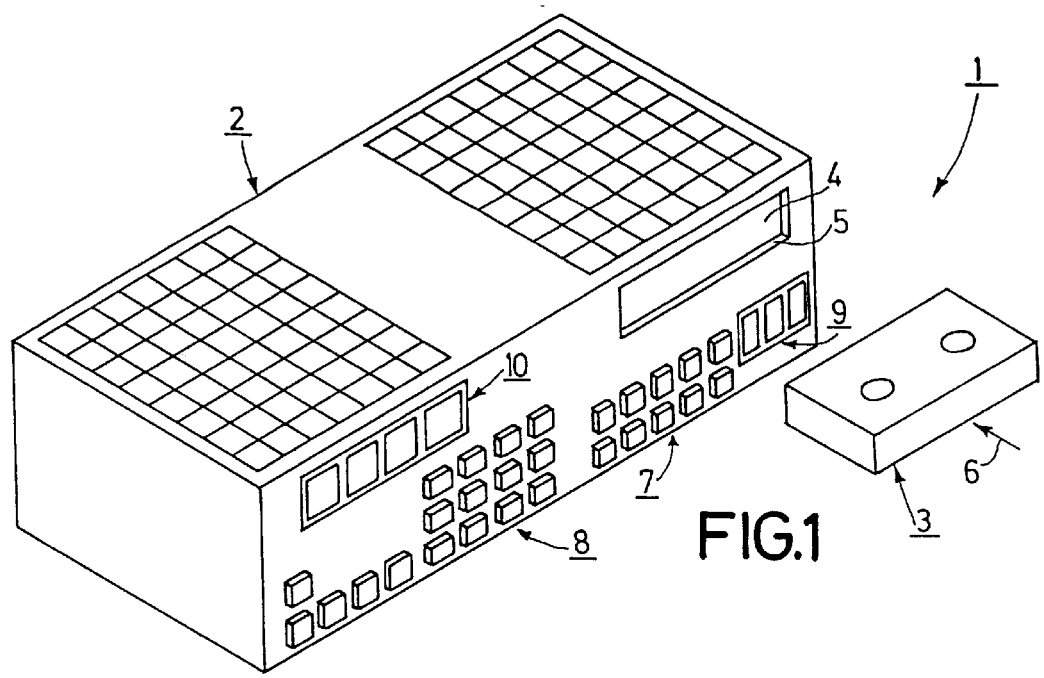
FIG. 1 shows a reduced-scale diagrammatic oblique view of a system for recording and reproducing television signals and sound signals, which system comprises an apparatus and a cassette for use in the apparatus, which cassette accommodates a magnetic tape, which extends between two juxtaposed reel hubs and on/from which television signals can be recorded and reproduced, respectively, in oblique tracks by means of rotatable magnetic heads of the apparatus, and which comprises a printed circuit board with resistors as indicators for indicating characteristic values of the magnetic tape of this cassette.

FIG. 1 shows a system 1 comprising a recording and reproducing apparatus 2 and a cassette 3 and adapted to record and reproduce television signals and sound signals on/from a magnetic tape 3 accommodated in the cassette 3. The cassette 3 comprises two juxtaposed reel hubs between which the magnetic tape extends along a path defined by means of tape guides of the cassette. The cassette 3 can be inserted by hand into the apparatus 2 in a direction indicated by an arrow 6 through an opening 5 which can be closed by means of a cover 4, which can be moved inward. When the cassette 3 is loaded into the apparatus 2 it is inserted into a movable cassette holder, which upon complete insertion of the cassette into the apparatus lowers the cassette substantially perpendicularly to the cassette main walls into an operating position, shown diagrammatically in FIG. 2, inside the apparatus. For starting the modes of the apparatus, such as "record", "normal forward play", "still reproduction", "normal reverse play", "fast forward", "fast reverse" and the like the apparatus 2 comprises a first set 7 of controls. For programming the apparatus and for entering further data, for example to set a daytime clock, the apparatus 2 comprises a second set 8 of controls. Moreover, the apparatus 2 comprises two display devices 9 and 10, whose displays each comprise for example seven segments and which serve for example for indicating the count of a tape-length measurement counter and for displaying the daytime.

As already stated, a cassette 3 inserted into the apparatus 2 is lowered into an operating position in the apparatus. As is shown diagrammatically in FIG. 2 the cassette 2 accommodates two juxtaposed rotatably drivable reel hubs 11 and 12 between which the magnetic tape 13 extends inside the cassette 3 along a path represented partly as a dash-dot line 14 and on which the magnetic tape can be wound in accordance with its instantaneous direction of transport and in opposite winding directions, as is indicated by means of the arrows 15 and 16. When a cassette 3 is lowered into its operating position in the apparatus 2 two reel spindles 17 and 18 enter into driving engagement with the reel hubs 11 and 12 in the cassette 3, which spindles are rotatably supported in a deck plate 19 of the apparatus 2. The reel spindles 17 and 18 can rotatably drive the two reel hubs 11 and 12 which coaxially engage with these spindles. To drive the two reel spindles 17 and 18 in the opposite directions of rotation 15 and 16 a drive arrangement 20 has been provided, which is shown only diagrammatically in FIG. 2 and which comprises a drive wheel 21, which can be motor driven and which is stationarily arranged in the apparatus 2, and a drive wheel 22, which can be driven by the first-mentioned wheel and which is supported to be movable parallel to the deck plate 19, which drive wheel 22 can be brought selectively into driving engagement with the circumference of one of two reel-spindle wheels 23 and 24 which are coaxial with and rotationally locked to the reel spindles 17 and 18 and which are disposed at the same axial level.

Figure 2:
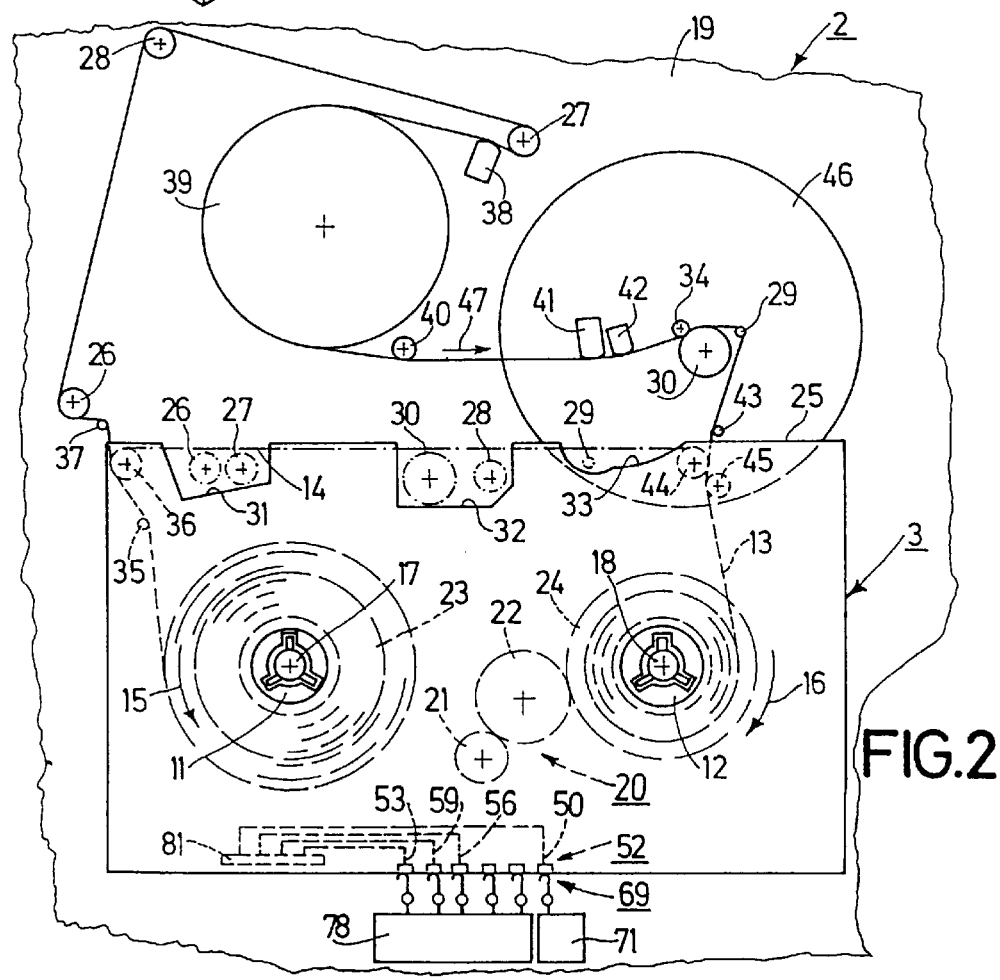
FIG. 2 shows diagrammatically and to a larger scale than in FIG. 1 a part of the apparatus of the system shown in FIG. 1, a cassette of the system shown in FIG. 1 being present in the apparatus and the magnetic tape being withdrawn from the cassette and wrapped around guiding and scanning elements of the apparatus, and the indicator resistors being connected to a part of the circuit arrangement of the apparatus, which part comprises a detection device for detecting parameters defined by means of the resistance values of the resistors.

When the cassette 3 is lowered into its operating position in the apparatus 2 a cassette shutter, not shown and arranged at its front 25, is opened to expose a cassette opening in the front 25, through which opening the magnetic tape 13 accommodated in the cassette 3 can be extracted, and four tape guides 26, 27, 28 and 29 and a pressure roller 30, which are each in a rest position shown in dash-dot lines in FIG. 2, engage three openings 31, 32 and 33 in the cassette 3, engaging behind the magnetic tape 13 at the location indicated by the dash-dot line 14. After the cassette 3 has been lowered into its operating position in the apparatus 2 the tape guides 26, 27, 28 and 29 can move into their operating positions shown in solid lines in FIG. 2, the pressure roller 30 being also movable into an intermediate position, not shown in FIG. 2, in the direct proximity of a capstan 34. The magnetic tape 13 is then withdrawn from the cassette 3 through the cassette opening in the front 25 of this cassette. From said intermediate position the pressure roller 30 can be moved into its operating position shown in solid lines in FIG. 2, in which position it presses the magnetic tape 13 against the capstan 34. Since the devices for opening the cassette shutter, actuating the tape guides and the pressure roller, and pressing the pressure roller against the capstan are not relevant to the invention they are now shown for the sake of simplicity. Such devices are known from existing apparatuses of this type.

After the tape guides 26, 27, 28, 29 and the pressure roller 30 have been moved to their operating positions the path of the magnetic tape 13 will be as indicated by a solid line in FIG. 2. The magnetic tape then extends from the reel hub 11 to the reel hub 12 via two tape guides 35 and 36 provided in the cassette 3, a tape-tension sensor pin 37, which forms part of a tape-tension control unit, not shown, the movable tape guides 26, 28 and 27, a stationary magnetic head 38 for erasing all the signals recorded on the magnetic tape 13, a drum-shaped scanning unit 39 comprising rotary magnetic heads for recording and reproducing television signals in/from contiguous video tracks which are inclined relative to the longitudinal direction of the magnetic tape, a stationary tape guide 40, a stationary magnetic head 41 for erasing audio signals recorded in an audio track extending in the longitudinal direction of the magnetic tape 13, a further stationary magnetic head 42 for recording and reproducing audio signals in the audio track and for recording and reproducing synchronisation signals in/from a synchronisation track extending in the longitudinal direction of the magnetic tape and parallel to the audio track, the capstan 34, against which the magnetic tape 13 is pressed by the pressure roller 30, the movable tape guide 29, a stationary tape guide 43, and two further tape guides 44 and 45 provided in the cassette 3.

The capstan 34, which is connected to the flywheel 46 in the customary manner, can be driven selectively in one of the two directions of rotation with a constant speed. When the pressure roller 30 is pressed against the capstan 34 this enables the magnetic tape 13 to be driven selectively in one of two opposite transport directions with a constant speed of transport. When the capstan 34, as viewed in FIG. 2, is driven anti-clockwise with a given speed the magnetic tape 13 is driven in the direction indicated by the arrow 47, which corresponds to the so-called "normal forward operation" for the recording of signals in the "record" mode as well as for the reproduction of signals in the "normal forward play" mode, in which the reel-spindle wheel 24, which is rotationally locked to the reel spindle 18, is driven by the drive wheel 22 of the drive arrangement 20 to wind the magnetic tape 13 onto the reel hub 12 in the direction indicated by the arrow 16. When the capstan 34 is driven with the same given speed but in the clockwise direction viewed in FIG. 2 the magnetic tape 13 is driven in a direction opposite to that indicated by the arrow 47, which corresponds to the so-called "normal reverse operation", also referred to as "reverse operation", in which in the "normal reverse play" mode recorded television signals are reproduced so as to obtain reverse motion scenes and in which the reel-spindle wheel 23, which is rotationally locked to the reel spindle 17, is driven by the drive wheel 22 of the drive arrangement 20 to wind the magnetic tape 13 onto the reel hub 11 in the direction indicated by the arrow 15.

For such a system 1 for recording and reproducing information signals on/from a magnetic tape 13 accommodated in a cassette 3 it is found to be very advantageous if the cassette is provided with at least one indicator for indicating by means of one of its parameters at least one characteristic value of an element of the cassette, the apparatus 2 comprising a detection device for detecting the indicator parameter indicating the at least one characteristic value. Suitably, such characteristic values of an element of the cassette which can be indicated by means of a parameter of an indicator, are the total storage capacity of the magnetic tape in the cassette for given speeds of transport of this tape, the total length of the magnetic tape in a cassette, the thickness of the magnetic tape in a cassette, the speed of transport of the magnetic tape relative to the device for recording and reproducing information signals of the apparatus, the recording characteristics of the magnetic tape in a cassette, and the type of magnetic tape accommodated in a cassette. However, it is also advantageous to indicate characteristic values not relating to the magnetic tape, for example the diameter of the reel hubs provided for taking up the magnetic tape in a cassette, or the distance between the two reel-hub axes, or a dimension of a lateral surface of the housing of a cassette.

Figure 3:
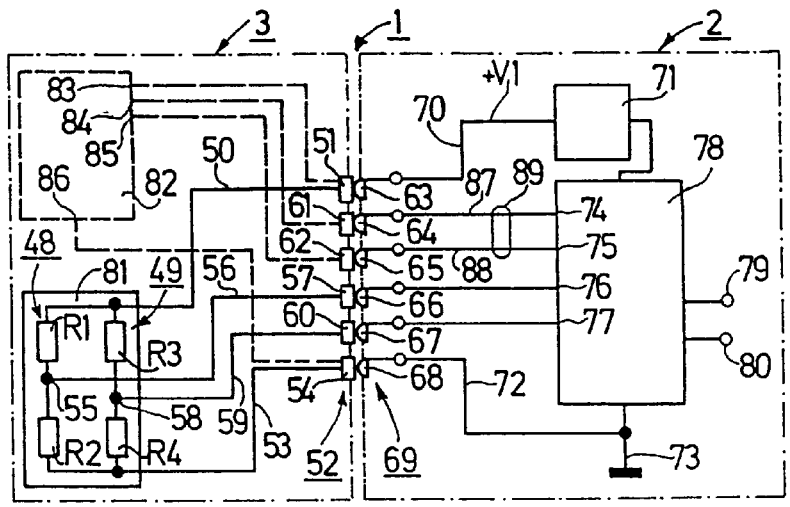
FIG. 3 shows diagrammatically a part of the electrical circuit arrangement of the system in accordance with the invention shown in FIGS. 1 and 2, which embodies a first variant and in which the printed circuit board in a cassette accommodates two voltage dividers, each comprising two resistors, as indicators for two characteristic values, the dividing ratio of each voltage divider being the parameter indicating a characteristic value.

In the system in accordance with the invention shown in FIGS. 1, 2 and 3 at least one electrical impedance has been provided as an indicator in a cassette 3, whose impedance value defines the parameter for indicating at least one characteristic value of an element of this cassette. As can be seen in FIG. 3, a first indicator 48 of the cassette 3 is formed by a first voltage divider comprising two ohmic resistors R1 and R2. In addition, a further indicator 49 of the cassette 3 is formed by a further voltage divider comprising two further resistors R3 and R4 and arranged in parallel with the first voltage divider 48. The node between the two resistors R1 and R3 is connected to a contact 51 of a contact set 52 of the cassette 3 via a connection 50. The node between the two resistors R2 and R4 is connected to a contact 54 of the contact set 52 via a connection 53. The tap 55 of the voltage divider 48 is connected to a contact 57 of the contact set 52 via a connection 56. The tap 58 of the voltage divider 49 is connected to a contact 60 of the contact set 52 via a connection 59. In the present case the contact set 52 also has two further contacts 61 and 62.

Complementary contacts 63, 64, 65, 66, 67 and 68 of a complementary contact set 69 of the apparatus 2 are engageable with the contacts 51, 54, 57, 60, 61 and 62 of the contact set 52 of a cassette 3 when a cassette 3 loaded into the apparatus 2 is brought into its operating position in the apparatus 2. A supply voltage stage 71 is connected to the complementary contact 71 via a connection 70 and supplies a supply voltage +V1 to the connection 70. The earth terminal 73 of the apparatus 2 is connected to the complementary contact 68 via a connection 72. The complementary contacts 64, 65, 66 and 67 are connected to the terminals 74, 75, 76 and 77 of a microcomputer 79 of the apparatus 2, which microcomputer 71 is powered by the supply voltage stage 71. The terminals 76 and 77 represent inputs via which the voltages appearing on the taps 55 and 58 of the two voltage dividers 48 and 49 can be applied to the microcomputer 78, which in addition to other functions is also adapted to form a detection device for detecting then voltages appearing on the taps 55 and 58, which voltages depend on the dividing ratios of the two voltage dividers 48 and 49 and, consequently, on the impedance values of the resistors R1, R2 and R3, R4 forming the respective voltage dividers 48 and 49.

In the system shown in FIGS. 1 to 3 the dividing ratio of the voltage divider 48, which ratio forms the parameter for indicating a characteristic value and is determined by the resistance values of the two resistors R1 and R2, indicates the thickness of the magnetic tape in a cassette 3. The dividing ratio of the voltage divider 49, which is determined by the resistance values of the two resistors R3 and R4, indicates the total length of the magnetic tape in a cassette 3. By providing voltage dividers having different resistance values and, consequently, different dividing ratios in cassettes which differ as regards the tape thickness and tape length it is simply possible to indicate and thus distinguish cassettes with, for example, four different tape thicknesses and cassettes with, for example, eight different tape lengths.

By means of the microcomputer 78 the voltages determined by the dividing ratios and appearing on the taps 55 and 58 can be detected simply and the microcomputer 78 accordingly supplies an identification signal to each of two control outputs 79 and 80, one characterizing the detected tape thickness and the other the detected total tape length. The identification signals supplied to the outputs 79 and 80 are available in the apparatus 2 and obviously also internally in the microcomputer 78 and can be processed and used for various purposes.

The resistors R1, R2, R3 and R4 are mounted on a printed circuit board 81. These resistors may be constructed as discrete elements but may also be formed by thick-film resistors. The printed circuit board 81 with the resistors R1, R2, R3 and R4 mounted on it may be constructed so as to be removable from the cassette 3 and to be replaced by a solid-state memory 82, indicated by a broken line in FIG. 3. The terminals 83, 84, 85 and 86 of the solid-state memory 82 can also be connected to contacts of the contact set 52 of the cassette 3, viz. to the contacts 51, 61, 62 and 54. In the present case the contacts 61 and 62 are connected to the complementary contacts 64 and 65, which in their turn are connected to the terminals 74 and 75 of the microcomputer 78 via a bus 78 having two lines 87 and 88. One of the lines 87 and 88 forms a data line and the other line forms a clock line. By means of these lines the microcomputer 78, which is also adapted to operate as a write and read device, can communicate with the solid-state memory 82. Instead of constructing the printed circuit board 81 with the resistors R1, R2, R3 and R4 mounted on it so as to be removable from the cassette 3 and to be replaced by a solid-state memory 82 a cassette 3 of the system 1 shown in FIG. 3 may advantageously accommodate both a printed circuit board 81 with resistors and a solid-state memory 82.

Thus, in the system 1 in accordance with the invention shown in FIGS. 1, 2 and 3 each cassette 3 of the system 1 has two indicators, each of the two indicators 48 and 49 being formed by a respective voltage divider R1, R2 and R3, R4. By means of an indicator 48 it is possible to indicate different tape thicknesses of the magnetic tape accommodated in a cassette by a suitable choice of the resistance values of the resistors R1 and R2 and, consequently, the dividing ratio in each cassette. By means of the other indicator 49 it is possible to indicate different total tape lengths of the magnetic tape accommodated in a cassette by a suitable choice of the resistance values of the resistors R3 and R4 and, consequently, the dividing ratio in each cassette.

Figure 4:
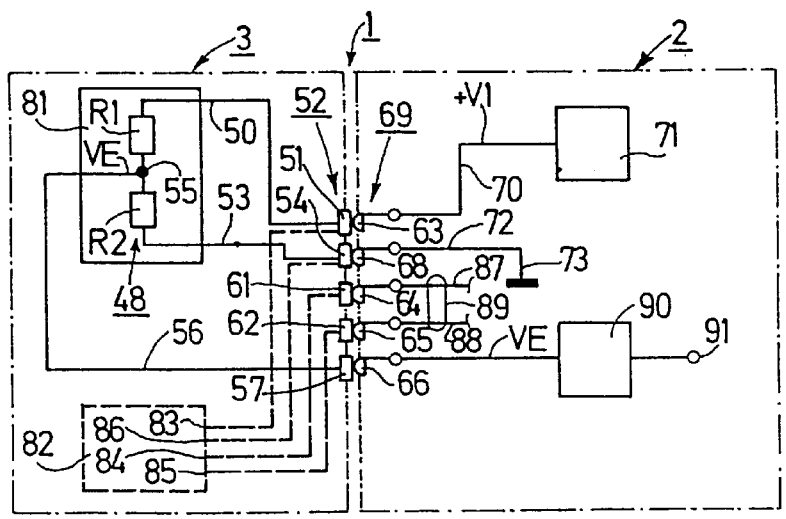
FIG. 4 shows diagrammatically a part of the electrical circuit arrangement of a system in accordance with the invention embodying a second variant, in which the printed circuit board accommodates only one voltage divider as an indicator for two characteristic values, which divider comprises two resistors each representing one characteristic value, the voltage appearing on the tap of the voltage divider being detectable by means of an amplitude detector provided as detection device in the apparatus.

In the system 1 in accordance with the invention shown in FIG. 4 a cassette 3 comprises only one voltage divider 48 as an indicator, which divider is formed by two resistors R1 and R2, which are arranged on a printed circuit board 81 and whose dividing ratio forms the parameter for indicating two characteristic values of an element of a cassette. The voltage divider 48 has one end, i.e. one end of the resistor R1, connected to the contact 51 and has its other end, i.e. one end of the resistor R2, connected to the contact 54 of the contact set 52 of the cassette 3. The tap 55 of the voltage divider 48 is connected to the contact 57 of the contact set 52.

The supply voltage stage 71 is connected to the complementary contact 63 of the complementary contact set 69 of the apparatus 2, which complementary contact can cooperate with the contact 51, and supplies a supply voltage +V1 to the connection 70. The earth terminal 73 of the apparatus 2 is connected to the complementary contact 64 which can cooperate with the contact 54. An amplitude detector 90, provided as a detection device to detect direct voltages and often also referred to as a voltage detector, is connected to the complementary contact 66 connected the contact 57. The amplitude detector 90 is adapted to detect the voltage appearing on the tap 55 of the voltage divider and supplies at an output 91 an identification signal which corresponds to the detected amplitude of the voltage on the tap 55 and which is used for further processing in the apparatus 2.

In the system shown in FIG. 2 the voltage divider 48 is provided as an indicator to indicate two characteristic values of an element of the cassette 3, the dividing ratio of the voltage divider being used as the parameter for this indication. The resistance value of the resistor R1 is selected in accordance with the total length L of the tape in a cassette 3 and the resistance value of the resistor R2 is selected in accordance with the thickness d of the tape in a cassette 3, so that the dividing ratio defined by the resistance of the resistor R1 and the resistance of the resistor R2 indicates the total tape length and tape thickness of a magnetic tape. The above facts are listed in the Table shown in FIG. 5. For example, as is apparent from this Table, a total tape length L1 corresponds to a resistance value (R1)1 of the resistor R1 and a tape thickness d2 corresponds to a resistance value (R2)2 of the resistor R2. The associated indication parameter, which corresponds to the dividing ratio and can be detected by means of the amplitude detector 90, is the voltage (VE)2 appearing on the tap 55 of the voltage divider 48.

In accordance with the relevant combination of the resistors R1 and R2 and the dividing ratio defined by this combination a voltage VE appears on the tap of the voltage divider 48, which voltage can occur in nine mutually different gradations, as is indicated in the Table shown in FIG. 5, and is applied to the amplitude detector 90 of the apparatus 2 to be detected by this detector 90. The amplitude detector 90 then produces on the output 91 at least one identification signal corresponding to the respective total tape length L and the respective tape thickness d of a magnetic tape in a cassette. Such an amplitude detector 90 may comprise, for example, a direct voltage level detection stage and an A/D converter following this stage, the identification signal on the output 91 then being a digital data word.

In the system shown in FIG. 4 the resistor board 81 in a cassette 3 can be replaced by a solid-state memory 82, as is indicated in broken lines in FIG. 4. It is also advantageous to arrange both a printed circuit board 81 and a solid-state memory 82 in a cassette 3 of the system 1 shown in FIG. 4.

Figure 6:
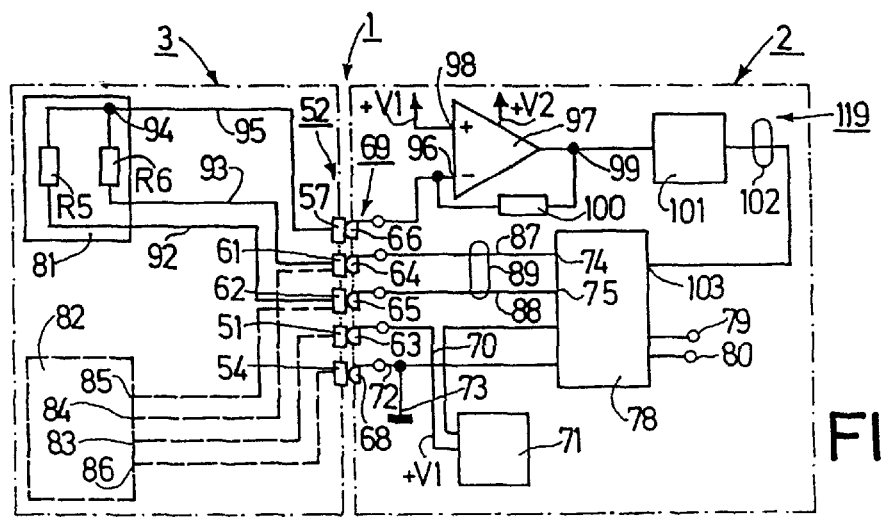
FIG. 6 shows diagrammatically a part of the electrical circuit arrangement of a system in accordance with the invention embodying a third variant, in which the printed circuit board in a cassette accommodates one resistor as an indicator for each one of two characteristic values and the apparatus comprises a detection device with an operational amplifier for detecting the resistance values of the two series-connected resistors.

In the system 1 shown in FIG. 6 two resistors R5 and R6 are provided as indicators in a cassette 3 and each serve to indicate a characteristic value of an element of a cassette, i.e. depending on its resistance value the resistor R5 can indicate the total tape length and depending on its resistance value the resistor R6 can indicate the tape thickness of the magnetic tape in a cassette.

In the system shown in FIG. 6 one end of the resistor R5 is connected to the contact 62 via a connection 92 and one end of the resistor R6 is connected to the contact 61 via a connection 93. The contacts 61 and 62 of the contact set 52 of the cassette 3 can be brought into contact with the complementary contacts 64 and 65 of the complementary contact set 69 of the apparatus 2, which complementary contacts in their turn are connected to the terminals 74 and 75 of a microcomputer 78 via the data line 87 and the clock line 88, the microcomputer being powered by the supply voltage stage 71. This stage 71 supplies a voltage +V1 of, for example, +5 V to the connection 70.

The two resistors R5 and R6 are interconnected in a node 94, which is connected to the contact 57 of the contact set 52 via a connection 95. The contact 57 can be brought into contact with the complementary contact 66, which is connected to the inverting input 96 of an operational amplifier 97, to whose non-inverting input 98 the supply voltage +V1 is applied and to which also a supply voltage +V2 of, for example, +12 V is applied. A feedback resistor 100 is arranged between the inverting input 96 and the output 99 of the operational amplifier 97.

The operational amplifier 97 forms a part of a detection device 119 capable of indirectly detecting the resistance values of the resistors R5 and R6. In order to determine the resistance value of the resistor R5 and of the resistor R6 the microcomputer 78 either pulls the data line 87 or the clock line 88 to earth potential, so that either the resistor R6 or the resistor R5 acts in conjunction with the feedback resistor 100. As a result, the gain of the operational amplifier 97 changes in accordance with the resistance value of the resistor R5 or R6 and, as a consequence, an output voltage representative of the resistance value of the resistor R5 or the resistor R6 will appear on the output of the operational amplifier 97. The output voltage of the operational amplifier 97 appearing on the output 99 is applied to an A/D converter 101, which also forms part of the detection device 119 and which, via a bus 102, supplies a data word representing the resistance value of one of the resistors R5 or R6 to a terminal 103 of the microcomputer 78, which microcomputer is also used to form the detection device 119 and processes this data word to generate on its two outputs 79 and 80 an identification signal indicating the resistance value of the resistor R5 or R6 and thus the tape length and the tape thickness of the magnetic tape in a cassette 3. Since in the system 1 shown in FIG. 6 the resistance values of the two resistors R5 and R6 provided to indicate each a characteristic value of an element of a cassette are always determined independently of one another in a time-multiplex process, a larger number of indication possibilities is obtained than, for example, with the system 1 shown in FIG. 4.

In the system 1 shown in FIG. 6 the two resistors R5 and R6 arranged on a printed circuit board 81 as indicators are also mounted in a cassette 3 so as to be removable therefrom and instead of the indicators R5 and R6 a solid-state memory 82 can be mounted in a cassette 3, which solid-state memory 82 can be connected to contacts of the contact set 52, so that these contacts can be used both for the connection of the indicators R5 and R6 and for the connection of a solid-state memory 82. In the system 1 shown in FIG. 6 it is also advantageous to arrange a solid-state memory 82 together with a printed circuit board provided with two indicator resistors R5 and R6 in a cassette 3 of this system 1.

Figure 7:
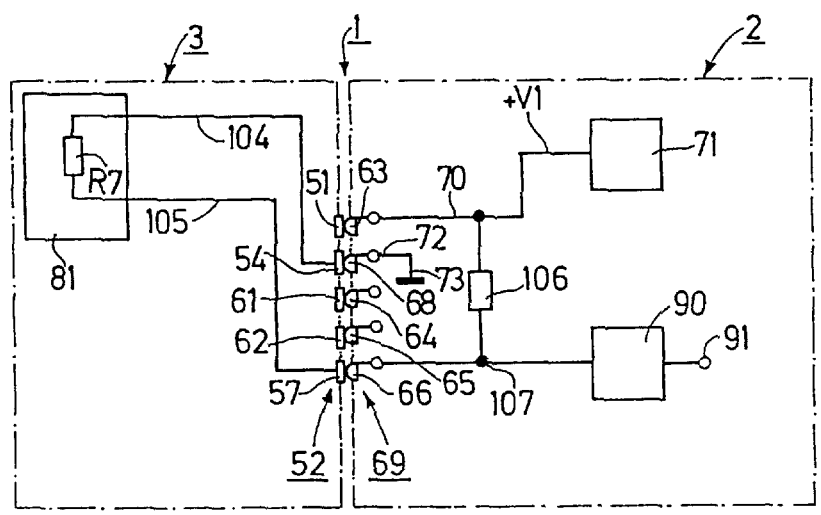
FIG. 7 shows diagrammatically a part of the electrical circuit arrangement of a system in accordance with the invention embodying a fourth variant, in which the printed circuit board in a cassette accommodates one resistor as an indicator for a characteristic value, which resistor in conjunction with a further resistor provided in the apparatus forms a voltage divider on whose tap a voltage appears which can be detected by means of an amplitude detector provided in the apparatus.

In the system 1 shown in FIG. 7 a cassette 3 of this system 1 comprises only one indicator, which in the present case is formed by a resistor R7, which is mounted on a printed circuit board 81 and whose resistance value serves as a parameter for the indication of a characteristic value of an element of the cassette 3. One end of the resistor R7 is connected to the contact 54 via a connection 104 and the other end of the resistor R7 is connected to the contact 57 of the contact set 52 via a connection 105. The complementary contact 68, which can be brought into contact with the contact 54, is connected to the earth terminal 73 of the apparatus 2 via the connection 72. The complementary contact 66, which can be brought into contact with the contact 57, is connected both to a resistor 106, whose other end is connected to the connection 70, to which the supply voltage +V1 supplied by the supply voltage stage 71 is applied, and to an amplitude detector 90 provided as detection device. Together with the indicator resistor R7 the resistor 106 forms a voltage divider on whose tap 107, which is connected to the complementary contact 66 and the amplitude detector 90, a voltage representative of the resistance value of the resistor R7 appears, which voltage can be detected by means of the amplitude detector 90, which is constructed as a voltage detector for the detection of direct voltages.

In the system 1 shown in FIG. 7 the indicator formed by the resistor R7 serves to indicate a single characteristic value of an element of a cassette 3, i.e. to indicate the recording characteristics of the magnetic tape accommodated in the cassette or, in other words, to indicate the type of magnetic tape. As is generally known, there are several different types of type having different recording characteristics because they have different magnetic as well as different mechanical characteristics. Depending on the choice of the resistance value of the indicator resistor R7 a specific voltage is obtained on the tap 107 of the voltage divider formed by the resistors 106 and R7, which voltage is detected by the amplitude or voltage detector 90, which in response thereto produces on its output 91 an identification signal corresponding to the detected type of tape.

In the system 1 shown in FIG. 7 both the complementary contact set of the apparatus 2 and the contact set 52 of a cassette 3 intended for use in the apparatus 2 have an adequate number of contacts to allow it to contact a solid-state memory mounted in a cassette 3 as an alternative or in addition and to be connected to a write and read apparatus and supply voltage means in the apparatus 2.

Figure 8:
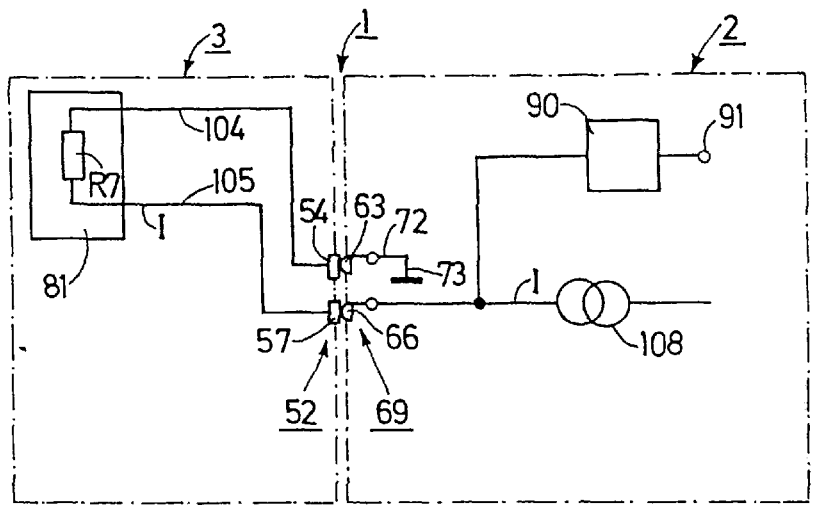
FIG. 8 shows a part of the electrical circuit arrangement of a system in accordance with the invention embodying a fifth variant, in which the printed circuit board in a cassette accommodates one resistor as an indicator for two characteristic values and the apparatus comprises a current source by means of which a constant current can be fed into the resistor, the voltage then appearing across the resistor being detectable by means of an amplitude detector of the apparatus.

In the system shown in FIG. 8, in the same way as in the system shown in FIG. 7, each cassette 3 comprises only one indicator, which is formed by a resistor R7 which is mounted on a printed circuit board 81 and whose resistance value serves as a parameter for the indication of at least one characteristic value. However, now the indicator serves to indicate two characteristic values of an element of the cassette 3, i.e. to indicate the diameter of the reel hubs and the axial distance of the reel hubs of a cassette, the apparatus 2 of this system being constructed, in a manner known per se, to operate with cassettes having different axial reel-hub distances and different reel hub diameters. It is obvious that the indicator resistor R7 may also be used to indicate only one characteristic value, for example the total tape length or the tape thickness.

In the system 1 shown in FIG. 8 the contact set 52 of each cassette 3 and the complementary contact set 69 of each apparatus 2 comprise only two contacts each. Both ends of the resistor R7 are now connected to the two contacts 54 and 57 of the contact set 52 of a cassette 3. The complementary contact 63 is connected to the earth terminal 73 of the apparatus 2 via bias MOS transistor the connection 72. The complementary contact 66 is connected to a current source 108, by means of which a constant current I can be fed through the indicator resistor R7, which produces a voltage drop across the resistor R7, so that on the complementary contact 66 a voltage representing the resistance value of R7 appears, which can be detected by means of a detection device formed by an amplitude detector 90, which is also constructed as a voltage detector for the detection of direct voltages and which in response thereto produces on its output 91 an identification signal representing the characteristic value indicated by the resistance value of the resistor R7.

In the system 1 shown in FIG. 8 a cassette 3 comprises two resistors R1 and R2 as indicators for each indicating a characteristic value of an element of the cassette 3, i.e. depending on its resistance value the resistor R1 can indicate the total tape length and depending on its resistance value the resistor R2 can indicate the tape thickness of the magnetic tape in the cassette 3.

Figure 9:
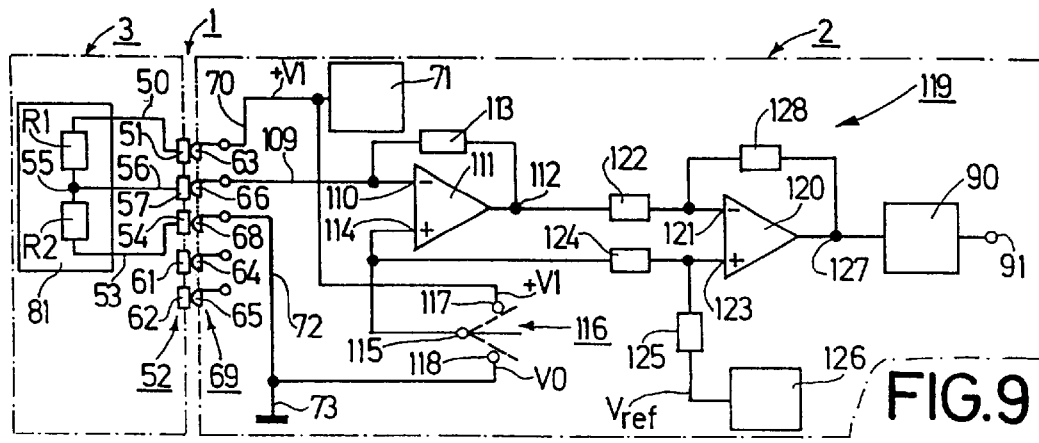
FIG. 9 shows a part of the electrical circuit arrangement of a system in accordance with the invention embodying a sixth variant, in which the printed circuit board in a cassette accommodates two series-connected resistors as indicators for two characteristic values and, to detect the resistance values of the two resistors, the apparatus comprises a detection device with two operational amplifiers arranged in series and a voltage detector arranged behind the second operational amplifier.

In the system shown in FIG. 9 one end of the resistor R1 is connected to the contact 51 of the contact set 52 via the connection 50. The other end of the resistor R1 is connected to one end of the resistor R2, the node between 55 between the two resistors R1 and R2 being connected to the contact 57 of the contact set 52 via a connection 56. The other end of the resistor R2 is connected to the contact 54 of the contact set 52 via the connection 53. The contact set 52 of the cassette 3 of the system 1 shown in FIG. 9 also comprises two further contacts 61 and 62. In combination with at least part of the other contacts 51, 54 and 57 these two contacts 61 and 62 serve for the connection of a solid-state memory, not shown in FIG. 9, which can be mounted in the cassette 3 of the system 1 shown in FIG. 9 instead of or also in addition to the resistors R1 and R2 arranged on the printed circuit board 81.

In the apparatus 2 of the system 1 shown in FIG. 9 the complementary contact 63 of the complementary contact set 69 is connected to the supply voltage stage 71 via the connection 70, which stage applies the supply voltage +V1 to the connection 70. The complementary contact 68 is connected to the earth terminal 73 of the apparatus 2 via the connection 72. The complementary contacts 64 and 65 are not connected in the situation shown in FIG. 9.

The complementary contact 66 of the complementary contact set 69 is connected to the inverting input 110 of an operational amplifier 111 via a connection 109. The output 112 of the operational amplifier 111 is connected to the inverting input 110 of this operational amplifier 111 via a feedback resistor 113. The non-inverting input 114 of the operational amplifier 111 is connected to the central terminal 115 of an electronic switching device 116, shown diagrammatically, which can be switched from an off-position to two on-positions shown diagrammatically in broken lines in FIG. 9, the central terminal 115 being connected to a first switching terminal 117 in a first on-position and to a second switching terminal 118 in a second on-position. The first switching terminal 117 is connected to the connection 70, so that the supply voltage +V1 is applied to the first switching terminal 117. The second switching terminal 118 is connected to the connection 72 to the earth terminal 73, so that the second switching terminal 118 is at earth potential V0.

The operational amplifier 111 forms part of a detection device 119 of the apparatus 2 of the system 1 shown in FIG. 2, which device can detect the resistance value of the resistor R1 and the resistance value of the resistor R2. In the present case the detection device 119 comprises a further operational amplifier 120, whose inverting input 121 is connected to the output of the operational amplifier 111 via a resistor 122. The non-inverting input 123 of the further operational amplifier 120 is connected to the inverting input 114 of the operational amplifier 111 via a resistor 124. The non-inverting input 123 of the further operational amplifier 120 is also connected to a further resistor 125, which is connected to a d.c. reference voltage source 126, which applies a reference voltage $V_{ref}$ to the resistor 125. The output 127 of the further operational amplifier 120 is connected to the inverting input 121 of the further operational amplifier 120 via a feedback resistor 128. The output 127 of the further operational amplifier 120 is connected to a voltage detector 90 of the detection device 119, by means of which the d.c. level appearing on the output 127 of the further operational amplifier 120 can be detected and which in response to the detected d.c. level produces on its output 91 an identification signal corresponding to the resistance value of one of the two resistors R1 and R2 detected by means of the detection device 119.

For first detecting the resistance value of, for example, the resistor R1 the switching device 116 is set to its second on-position, in which its central terminal 115 is connected to the second switching terminal 118. As a result, earth potential V0 is applied to the non-inverting input 114 of the first operational amplifier 111 and, owing to the properties of an operational amplifier, the potential on the inverting input 110 of the first operational amplifier 111 is also pulled to earth potential V0, so that the resistor R2, which has one terminal at earth potential V0, is disabled and only the resistor R1, which has one end connected to the supply voltage +V1, acts upon the inverting input 110 of the first operational amplifier 111. This results in a current through the resistor R1, whose current value depends on the resistance value of R1. This current through the resistor R1 produces an output voltage proportional to the resistance value of R1 on the output 112 of the first operational amplifier 111.

For subsequently detecting the resistance value of the resistor R2 the switching device 116 is set to its first on-position, in which its central terminal 115 is connected to the first switching terminal 117, as a result of which the supply voltage +V1 appears on the non-inverting input 114 of the first operational amplifier 111. The operational amplifier 111 then also causes the potential on its inverting input 110 to be pulled to the supply potential +V1, so that the resistor R1, which also has one terminal connected to the supply voltage +V1, is disabled and only the second resistor R2, which has one terminal at earth potential V0, acts upon the inverting input 110 of the first operational amplifier 111. This causes a current proportional to the resistance value of the resistor R2 to flow through this resistor R2. This current through the resistor R2 produces an output voltage proportional to the resistance value of R2 on the output 112 of the first operational amplifier 111.

The output voltage on the output 112 of the first operational amplifier 111 depends in the first place on the instantaneous resistance value of the resistor R1 or R2 connected to the inverting input 110 but as a result of the change-over of the potential applied to the non-inverting input 114, i.e. between V0 and +V1, an undesired offset voltage is superimposed on this output voltage and may give rise to an incorrect detection. To suppress or minimize this offset voltage on the output of the first operational amplifier 111 so as to avoid adverse effects of this offset voltage, the further operational amplifier 120 has been provided and is advantageously arranged to also receive selectively at its non-inverting input 123, via the resistor 124, the potentials which can be applied to the central terminal 115 of the switching device 116 and thus to the non-inverting input 114 of the first operational amplifier 111 by means of this switching device 116, i.e. V0 and +V1. This results in a substantially offset-free output voltage on the output 127 of the further operational amplifier 120, which output voltage is applied to the d.c. level detector 90, which detects the value of the instantaneous d.c. level appearing on the output 127 of the further operational amplifier 120 and produces a corresponding identification signal on its output 91.

As stated hereinbefore, the non-inverting input 123 of the further operational amplifier 120 is connected to a further resistor 125, via which a reference voltage $V_{ref}$ can be applied to the non-inverting input 123. By applying a given reference voltage $V_{ref}$ it is achieved that the d.c. level on the output 127 of the further operational amplifier 120 is defined relative to this given reference voltage $V_{ref}$ and can be adapted simply to different situations and requirements. The reference voltage $V_{ref}$ may, for example, have a value equal to the earth potential V0 or a value equal to +½V1.

Figure 10:
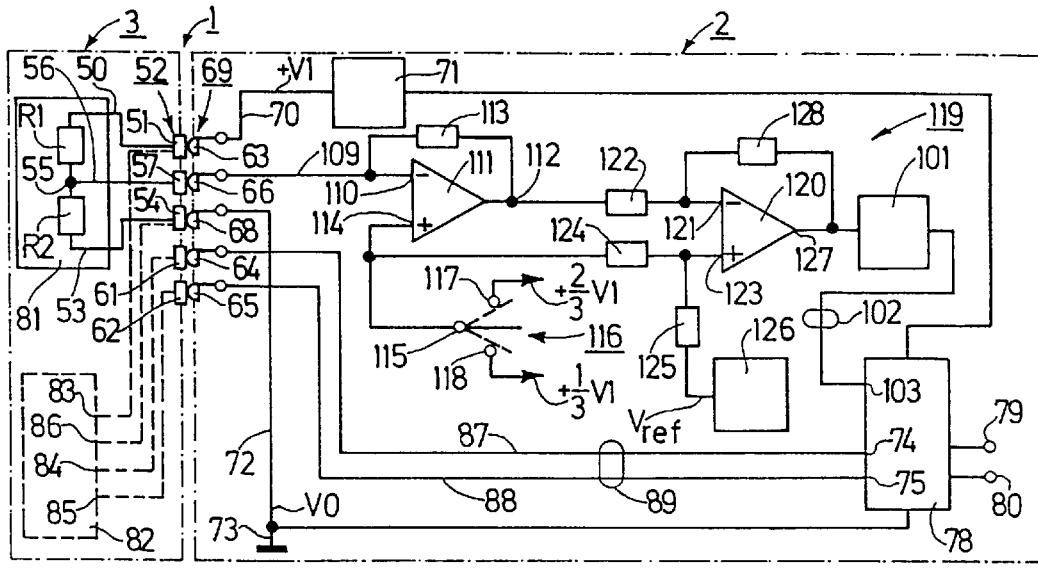
FIG. 10 shows a part of the electrical circuit arrangement of a system in accordance with the invention embodying a seventh variant, in which the printed circuit board in a cassette accommodates two series-connected resistors as indicators for two characteristic values and, to detect the resistance values of the two resistors, the apparatus comprises a detection device with two operational amplifiers arranged in series and an analog-to-digital converter followed by a microcomputer being arranged behind the second operational amplifier.

In the system shown in FIG. 10 a cassette 3, in exactly the same way as in the system shown in FIG. 9, comprises two resistors R1 and R2 as indicators for the cassette 3, which resistors each serve for the indication of a characteristic value of an element of the cassette 3. In the same way as in a cassette 3 of the system 1 shown in FIG. 9 the cassette 3 of the system 1 shown in FIG. 10 may alternatively or additionally comprise a solid-state memory 82, as is indicated in broken lines in FIG. 10.

In the system 1 shown in FIG. 10 the apparatus 2 also comprises a detection device 119, which is partly of a construction similar to that of the detection device 119 of the apparatus 2 of the system 1 shown in FIG. 9. In an apparatus 2 of the system 1 shown in FIG. 10 the detection device 119 comprises a first operational amplifier 111 followed by a second operational amplifier 120. However, in the detection device 119 of the variant shown in FIG. 9 either the voltage V0, i.e. earth potential, or the supply voltage +V1 can be applied to the non-inverting input 114 of the first operational amplifier 111, as a result of which the output voltage on the output 112 of the first operational amplifier 111 can be higher than the supply voltage +V1 or lower than the supply voltage V0, i.e. earth potential, whereas in the detection device of the variant shown in FIG. 10 a voltage +⅓V1 or a voltage +⅔V1 is applied to the non-inverting input 114 of the first operational amplifier 111 via the switching device 116 in its second on-position and in its first on-position, respectively. This prevents the voltage on the output 112 of the first operational amplifier 111 in the variant shown in FIG. 10 from becoming higher than the supply voltage +V1 or lower than the supply voltage V0, i.e. earth potential.

Since in the variant shown in FIG. 10 the voltage +⅓V1 or the voltage +⅔V1 instead of the supply voltage V0, i.e. earth potential, or the supply voltage +V1, is applied to the non-inverting input 114 of the first operational amplifier 111 during the respective detection cycle for the detection of the respective resistance value of the resistor R1 or the resistor R2 a current will flow in the inverting input 110 of the first operational amplifier 111 during each of these detection cycles, the value of this current being dependent on both resistances R1 and R2 and not on one of these resistors, as in the variant shown in FIG. 2. As a result, the output voltage appearing on the output 112 of the first operational amplifier 111, which owing to the above steps can only lie between V0 and +V1, also depends on both resistances R1 and R2. In the variant shown in FIG. 10 the resistance value of each of the two resistors R1 and R2 is determined in that two directly succeeding detection cycles are performed in a time-multiplex process, the voltage +⅓V1 being applied to the non-inverting input 114 of the first operational amplifier 11 during one detection cycle and the voltage +⅔V1 during the next detection cycle. In each of these two detection cycles an output voltage is obtained on the output 112 of the first operational amplifier 111 and on the output 127 of the second operational amplifier 120, respectively, one of these output voltages being dependent on a first ratio of the resistance values of the two resistors R1 and R2 and the other output voltage being dependent on a second ratio of the resistance values of the two resistors R1 and R2. The voltage appearing on the output 127 of the second operational amplifier 120 is converted into a digital value by means of a subsequent analog-to-digital converter 101, which digital value is transferred to an input 103 of a microcomputer 78 via a bus 102. The microcomputer 78 stores the digital value corresponding to each of the two output voltages and when both digital values are available the microcomputer 78 computes the individual resistance values of the two resistors R1 and R2 from these two digital values in a subsequent computing operation. Subsequently, the microcomputer 78 produces on each of its two outputs 79 and 80 an identification signal corresponding to the computed resistance value and thus to a characteristic value of an element of the cassette 3.

With respect to the two variants shown in FIGS. 9 and 10 it is to be noted that the provision of a second operational amplifier 120 to suppress or minimize the offset voltage produced by the first operational amplifier 111 is not strictly necessary if the voltage differences between the output voltages on the output 112 of the first operational amplifier 111 so large that the superposed offset voltages cannot give rise to an erroneous detection of these output voltages.

Figure 11:
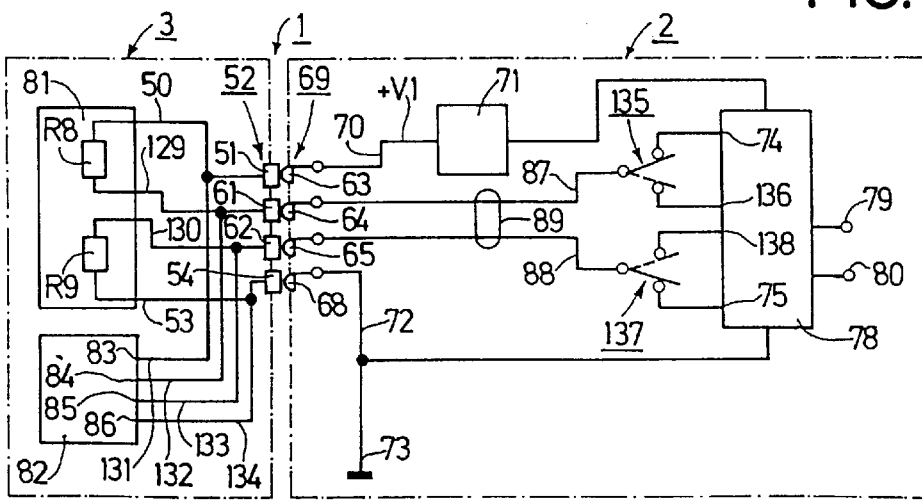
FIG. 11 shows a part of the electrical circuit arrangement of a system in accordance with the invention embodying an eighth variant, in which the printed circuit board in a cassette accommodates two electrically separated resistors as indicators for two characteristic values and, to detect the resistance values of the two resistors, the apparatus comprises a detection device which can basically be realized by means of a microcomputer.

In the system 1 shown in FIG. 11 the indicators of a cassette 3 are formed by two resistors R8 and R9, which each serve to indicate one characteristic value of an element of the cassette 3. For example, the resistor R8 can again be used to indicate a total tape length and the resistor R9 to indicate the tape thickness of the magnetic tape of the cassette 3. However, these two resistors R8 and R9 may also indicate other characteristic values of elements of the cassette 3.

In the system shown in FIG. 11 the two resistors R8 and R9 are wholly electrically separated from one another. The resistor R8 has one end connected to the contact 51 of the contact set 52 via the connection 50. The other end of the resistor R8 is connected to the contact 61 of the contact set 52 via a connection 129. One end of the resistor R9 is connected to the contact 54 of the contact set 52 via the connection 53 and its other end is connected to the contact 62 via a connection 130. In addition to the resistors R8 and R9, which are arranged on a printed circuit board 81, a cassette 3 of the system 1 shown in FIG. 11 comprises a solid-state memory 82, which in the present case is fixedly mounted in the cassette 3, for which reason it is shown in solid lines in FIG. 11. The terminals 83, 84, 85 and 86 of the solid-state memory 82 are connected to the connections 50, 129, 130 and 53 via connections 131, 132, 133 and 134, and to the contacts 51, 61, 62 and 54 of the contact set 52 via the first-mentioned connections.

The apparatus 2 of the system 1 shown in FIG. 11 also comprises a complementary contact set 69, whose complementary contact 63 enters into electrical contact with the contact 51, whose complementary contact 64 enters into electrical contact with the contact 61, whose complementary contact 65 enters into electrical contact with the contact 62, and whose complementary contact 68 enters into electrical contact with the contact 54 when a cassette 3 is loaded into the apparatus 2. The connection 70 connects the complementary contact 63 to the supply voltage stage 71, which supplies the supply voltage +V1 to the connection 70. The complementary contact 68 is connected to the earth terminal 73 via the connection 72. The complementary contact 64 is connected to the line 87 of the bus 89 and the complementary contact 65 is connected to the line 88 of the bus 89. The line 87 is the data line and the line 88 is the clock line, the data line 87 being connected to a terminal 74 and the clock line 88 being connected to a terminal 75 of the microcomputer 78. In the present variant shown in FIG. 11 the microcomputer 78 operates both as a write and read device for the solid-state memory 82 and as a detection device for detecting the resistance values of the two resistors R8 and R9. The data line 87 includes an electronic switching device 135, shown diagrammatically, via which the complementary contact 64 can be connected to an input 136 of the microcomputer 78. The clock line 88 includes a further electronic switching device 137, shown diagrammatically, via which the complementary contact 65 can be connected to a further input 138 of the microcomputer 78.

In order to determine the resistance values of the two resistors R8 and R9 independently of one another in the variant shown in FIG. 11 two detection cycles which succeed one another in time are performed in a time-multiplex process. First of all, for example the switching device 135 in the data line 87 is set to the switch position in which the complementary contact 64 is connected to the input 136 of the microcomputer 78, upon which the resistor R8 is connected to the input 136 of the microcomputer 78 via the complementary contact 64, the contact 61 and the connection 129, the other end of the resistor R8 being connected to the supply voltage stage 71, i.e. to the supply voltage +V1, via the connection 50, the contact 51 and the complementary contact 63. The microcomputer internally assures that a current or voltage which depends on the resistance value of R8 appears on the input 136 of the microcomputer 78, the magnitude of this current or voltage being detected in the microcomputer 78 after digitization in the microcomputer 78, after which the microcomputer 78 produces an identification signal corresponding to the resistance value of the resistor R8 on its output 79.

Subsequently, the switching device 137 in the clock line 88 is set from its switch position in which it enables the transfer of a clock signal to the switch position in which the complementary contact 65 is connected to the input 138 of the microcomputer 78. As a result, the resistor R9 is connected to the input 138 via the switching device, the remainder of the clock line 88, the complementary contact 65, the contact 62, and the connection 130, the other end of the resistor being connected to the earth terminal 73 via the connection 53, the contact 54, the complementary contact 68 and the connection 72. The microcomputer then internally assures that a current or voltage which depends on the resistance value of R9 appears on the input 138, the magnitude of this current or voltage being detected in the microcomputer 78 after digitization in the microcomputer 78, after which the microcomputer 78 produces an identification signal corresponding to the resistance value of the resistor R9 on its output 80.

With respect to the choice of the resistance values of the two resistors R8 and R9 in the variant shown in FIG. 11 it is to be noted that this choice of the resistance values should be adapted to the solid-state memory 82 which is used, in such a manner that the resistors R8 and R9 do not adversely affect the normal operation of the solid-state memory 82.

The variant shown in FIG. 11 has the advantage that both the contact set 52 and the complementary contact set 69 comprise only four contacts each, so that despite the provision of two indicator resistors R8 and R9 and a solid-state memory 82 a minimal number of contacts is required.

In each of the four variants shown in FIGS. 3, 4, 6 and 11 a bus 89 comprising a data line 87 and a clock line 88 is arranged between a microcomputer 78 operated as a write and read device of an apparatus 2 and a solid-state memory 82 of a cassette 1, which bus leads via two contacts 61 and 62 on a cassette and two complementary contacts 64 and 65 of an apparatus. It is to be noted that there are also solid-state memories communicating via a bus comprising only a data line, the clock information being derived from the edges of the data signals. If such a solid-state memory is or has been used in a cassette in accordance with the invention the number of contacts on the cassette and the number of complementary contacts on the apparatus can be reduced by one, so that it is adequate to have three contacts and three complementary contacts in total. Two resistors may then be combined to one voltage divider, whose dividing ratio forms the parameter for then indication of one or two characteristic values, or whose individual resistance values each form a parameter for the indication of one characteristic value, the tap of this divider being connected to that contact of the cassette which is also connected to the data line and its two other terminals being connected to two further contacts of the cassette to apply a supply voltage to the solid-state memory. Moreover, such a cassette may comprise only one indicator resistor having one end connected to that contact of the cassette which is also connected to the data line and having its other end connected to a further contact of the cassette to apply a supply potential to the solid-state memory.

In the three variants shown in FIGS. 9, 10 and 11 the resistance values of two indicator resistors are detected or determined at least substantially independently of one another. This is particularly advantageous in order to obtain a maximal number of indication possibilities, which also applies to the variant shown in FIG. 6 and has been explained in the description with reference to FIG. 6.

In the embodiments described hereinbefore an indicator of a cassette, i.e. at least one electrical impedance, indicates a characteristic value of the magnetic tape accommodated in this cassette or a characteristic value relating to the reel hubs of a cassette. However, by means of such an indicator it is also possible to indicate other characteristic values of an element of a cassette, for example the size of the housing of a cassette. In the embodiments described above the indicator impedances are formed by ohmic resistors. However, the impedances may also be formed by capacitors or inductors whose capacitance or inductance values define the parameter for the indication of at least one characteristic value of an element of a cassette. In the embodiments described hereinbefore the indicator resistors are each time formed by a single resistor. However, an indicator resistor may also be formed by a parallel arrangement of two or more resistors in order to obtain a fine gradation of resistance values. The indication of at least one characteristic value of an element of a cassette can also be effected by means of an infinitely high resistance value, which means that in order to realize an infinitely high resistance value no resistor is arranged between two contacts intended for the connection of a resistor in a cassette. Moreover, it is possible to arrange a jumper between two contacts intended for the connection of a resistor in a cassette, in which case the indication of at least one characteristic value of an element of this cassette is effected by means of the resistance value zero. The embodiments described hereinbefore relate to magnetic-tape systems. However, the steps in accordance with the invention can also be applied to systems comprising apparatuses and cassettes for photographic record carriers, i.e. films, or in systems for disc-shaped record carriers accommodated in cassettes.

What is claimed is:

1. An improvement in a system for recording and/or reproducing information signals on/from a record carrier, which system comprises an apparatus having a device for recording and/or reproducing information signals on/from said record carrier and a cassette adapted to be inserted into the apparatus, which cassette accommodates said record carrier and comprises at least one indicator; which by means of one of its parameters indicates at least one characteristic value of a fixed element of said record carrier, the apparatus comprising at least one detection device for the detection of the parameter of the indicator, which parameter indicates the at least one characteristic value, wherein the improvement comprises at least one electrical impedance in the cassette as said indicator in said cassette, the impedance value of said impedance defining the parameter for the indication of at least one characteristic value of a fixed element of said record carrier of said cassette, and the at least one detection device of the apparatus is adapted to detect the parameter defined by the impedance value of the at least one impedance.

2. A system as claimed in claim 1, wherein the at least one electrical impedance provided as an indicator of the cassette is connected to electrically conductive contacts of a contact set of the cassette, which contacts are accessible from outside the cassette, and the apparatus comprises electrically conductive complementary contacts of a complementary contact set of the apparatus, which complementary contacts can be brought into contact with the contacts of the cassette, at least one of said complementary contacts being connected to the detection device of the apparatus to connect the detection device of the apparatus to the at least one indicator impedance of a cassette inserted in the apparatus.

3. A system as claimed in claim 2, wherein there is provided at least one ohmic resistor as an indicator of the cassette, the ohmic resistance value of said resistor defining the parameter for the indication of at least one characteristic value of an element of said cassette.

4. A system as claimed in claim 3, wherein the cassette comprises two ohmic resistors as indicators, which are interconnected in a node connected to a contact and which are each connected to a further contact, and the detection device of the apparatus is connected to a complementary contact which can be brought into contact with the contact connected to the node between the two resistors.

5. A system as claimed in claim 3, wherein there is provided a voltage divider formed by two ohmic resistors as an indicator of the cassette, the dividing ratio of said voltage divider, which is defined by the resistance values of the two resistors being the parameter for the indication of at least one characteristic value of a fixed element of the record carrier and the tap of said voltage divider being connected to a contact of the cassette, and the detection device of the apparatus is connected to a complementary contact which can be brought into contact with the contact connected to the tap and is adapted to detect the voltage appearing on the tap of the voltage divider and determined by the dividing ratio of the voltage divider.

6. A system as claimed in claim 5, wherein there is provided as a further indicator in the cassette a further voltage divider formed by two ohmic resistors arranged in parallel with the one voltage divider, the dividing ratio of said further voltage divider, which is defined by the resistance values of the two further resistors being the parameter for the indication of at least one characteristic value of a fixed element of the record carrier and the tap of said further voltage divider being connected to a further contact of the cassette, and the detection device of the apparatus is connected to a further complementary contact which can be brought into contact with the further contact connected to the tap and is adapted to detect the voltage appearing on the tap of the further voltage divider and determined by the dividing ratio of the further voltage divider.

7. A system as claimed in claim 6, wherein the at least one impedance provided as an indicator in the cassette is mounted in the cassette so as to be removable therefrom and alternatively a solid-state memory can be mounted in the cassette, which solid-state memory has terminals which can also be connected to contacts of the contact set of the cassette, and in the apparatus there may be provided a write and read device for writing into and reading out the solid-state memory, which write and read device can be connected to complementary contacts of the complementary contact set for connection of the write and read device to the solid-state memory of a cassette inserted in the apparatus.

8. A system as claimed claim 6, wherein in addition to the at least one impedance provided in the cassette as an indicator a solid-state memory is mounted in the cassette and has terminals which can also be connected to contacts of the contact set of the cassette, and in the apparatus there is provided a write and read device for writing into and reading out the solid-state memory, which write and read device can be connected to complementary contacts of the complementary contact set for connection of the write and read device to the solid-state memory of the cassette inserted in the apparatus.

9. A system as claimed in claim 8, wherein the a cassette of the system has a contact set comprising four contacts and an apparatus of the system has a complementary contact set comprising four complementary contacts, of which two complementary contacts and two contacts which can be brought into contact with the last-mentioned complementary contacts are arranged to transfer supply potentials, and two further complementary contacts, which are connected to the write and read device by two lines and two further contacts which can be brought into contact with said further complementary contacts, are arranged to transfer data signals and clock signals from the write and read device of the apparatus to the solid-state memory in the cassette, at least one impedance provided as an indicator is arranged between at least one contact for the transfer of a supply potential and a further contact for the transfer of data or clock signals, and a switching device is arranged in at least one of the two lines leading from the write and read device to the further complementary contacts for the transfer of data and clock signals, by which switching device the impedance provided as an indicator can be connected to the detection device of the apparatus.

10. A system as claimed in claim 9, wherein the at least one impedance provided as an indicator in a cassette is arranged to indicate the total storage capacity of the record carrier accommodated in said cassette.

11. A system as claimed in claim 10, wherein the at least one impedance provided as an indicator in the cassette is arranged to indicate the thickness of the record carrier accommodated in said cassette.

12. A system as claimed in claim 11, wherein the at least one impedance provided as an indicator in the cassette is arranged to indicate the speed of transport allocated to the record carrier in said cassette relative to the device for recording and/or reproducing information signals of the apparatus.

13. A system as claimed in claim 12, wherein the at least one impedance provided as an indicator in the cassette is arranged to indicate the recording characteristics of the record carrier accommodated in said cassette.

14. An improvement in a cassette which accommodates a record carrier and which cassette comprises at least one indicator which by means of one of its parameters indicates at least one characteristic value of a fixed element of the record carrier, the improvement comprising that there is provided at least one electrical impedance as said at least one indicator comprised by the cassette, the impedance value of said impedance defining the parameter for the indication of at least one characteristic value of a fixed element of said record carrier.

15. A cassette as claimed in claim 14, characterized in that the at least one electrical impedance provided as an indicator comprised by the cassette is connected to electrically conductive contacts of a contact set of the cassette, which contacts are accessible from outside the cassette.

16. A cassette as claimed in claim 15 wherein there is provided at least one ohmic resistor as an indicator comprised by the cassette, the ohmic resistance value of said at least one resistor defining the parameter for the indication of at least one characteristic value of a fixed element of said record carrier.

17. A cassette as claimed in claim 16, wherein the cassette comprises two ohmic resistors as indicators, which are interconnected in a node connected to a contact and which are each connected to a further contact.

18. A cassette as claimed in claim 16, wherein there is provided a voltage divider formed by two ohmic resistors as an indicator comprised by the cassette, the dividing ratio of said voltage divider, which is defined by the resistance values of the two resistors, being the parameter for the indication of at least one characteristic value of said element of the record carrier and the tap of said voltage divider being connected to a contact arranged to connect the tap of the voltage divider to a detection device adapted to detect the voltage appearing on the tap of the voltage divider and determined by the dividing ratio of the voltage divider.

19. A cassette as claimed in claim 18, wherein there is provided as a further indicator comprised by the cassette a further voltage divider formed by two ohmic resistors arranged in parallel with the one voltage divider, the dividing ratio of said further voltage divider, which is defined by the resistance values of the two further resistors being the parameter for the indication of at least one characteristic value of an element of the cassette and the tap of said further voltage divider being connected to a contact of the cassette arranged to connect the tap of the further voltage divider to a detection device adapted to detect the voltage appearing on the tap of the further voltage divider and determined by the dividing ratio of the further voltage divider.

20. A cassette as claimed in claim 19, wherein the at least one impedance provided as an indicator comprised by the cassette is mounted in the cassette so as to be removable therefrom and alternatively a solid-state memory can be mounted in the cassette, which solid-state memory has terminals which can also be connected to contacts of the contact set of the cassette.

21. A cassette as claimed in claim 19, wherein in addition to the at least one impedance provided in the cassette as an indicator a solid-state memory is mounted in the cassette and has terminals which are also connected to contacts of the contact set of the cassette.

22. A cassette as claimed in claim 21, wherein the cassette has a contact set comprising four contacts, of which two contacts are arranged to transfer supply potentials and two further contacts are arranged to transfer data signals and clock signals to the solid-state memory in the cassette, and at least one impedance provided as an indicator is arranged between at least one contact for the transfer of a supply potential and a further contact for the transfer of data or clock signals.

23. A cassette as claimed in claim 22, wherein the at least one impedance provided as an indicator in the cassette is arranged to indicate the total storage capacity of the record carrier accommodated in said cassette.

24. A cassette as claimed claim 23, claimed in any one of the claims 1 to 11, wherein the at least one impedance provided as an indicator in the cassette is arranged to indicate the thickness of the record carrier accommodated in said cassette.

25. A cassette as claimed in claim 24, wherein the at least one impedance provided as an indicator in the cassette is arranged to indicate the speed of transport allocated to the record carrier in said cassette relative to a device provided in the apparatus to record and/or reproduce information signals of the apparatus.

26. A cassette as claimed in claim 25, wherein the at least one impedance provided as an indicator in the cassette is arranged to indicate the recording characteristics of the record carrier accommodated in said cassette.

27. In an apparatus comprising a device for recording and/or reproducing information signals on/from a record carrier provided in a cassette and into which said cassette can be inserted, which cassette comprises at least one indicator which by means of one of its parameters indicates at least one characteristic value of a fixed element of said record carrier and which comprises a detection device for the detection of the parameter of the indicator, which parameter indicates the at least one characteristic value, the improvement wherein the detection device of the apparatus is adapted to detect the parameter defined by the impedance value of at least one impedance provided as an indicator in said cassette adapted to be inserted into the apparatus.

28. An apparatus as claimed in claim 27, characterized in that the apparatus comprises a plurality of electrically conductive complementary contacts of a complementary contact set of the apparatus, which complementary contact set is adapted to cooperate and establish contact with a contact set of a cassette adapted to be inserted into the apparatus, which contact set comprises contacts, at least one of said complementary contacts being connected to the detection device of the apparatus.

29. An apparatus as claimed in claim 28, wherein the detection device comprises an operational amplifier between whose output and whose inverting input an ohmic feedback resistor is arranged and to whose inverting input at least one ohmic resistor can be connected, which resistor has been provided as an indicator of the cassette adapted to be inserted into the apparatus.

30. An apparatus as claimed in claim 29, wherein the non-inverting input of the one operational amplifier of the detection device is connected to the output of a switching device having two inputs, and a potential ($+V1$, $+\frac{2}{3}V1$) can be applied to one input of the switching device, which potential has a value in the range of a potential ($+V1$) which can be applied to an ohmic resistor provided as an indicator in a cassette, and another potential ($V0$, $+\frac{1}{3}V1$) can be applied to the other input of the switching device, which other potential has a value in the range of another potential ($V0$) which can be applied to another ohmic resistor provided as an indicator in a cassette.

31. An apparatus as claimed in claim 30, wherein in order to compensate for the offset voltage produced on the output of the one operational amplifier as a result of the change-over of the potential on the non-inverting input of the one operational amplifier, the inverting input of a further operational amplifier of the detection device is connected to the output of the one operational amplifier, which further operational amplifier has its non-inverting input connected to the non-inverting input of the one operational amplifier and to the output of the switching device.

32. An apparatus as claimed in claim 31, wherein a d.c. reference voltage source is connected to the non-inverting input of the further operational amplifier of the detection device and supplies a d.c. reference voltage ($V_{ref}$) to adjust the d.c. level on the output of the further operational amplifier.

33. An apparatus as claimed in claim 32, wherein a voltage detector is connected to the output of the further operational amplifier of the detection device for the detection of the output voltage of the further operational amplifier.

34. An apparatus as claimed in claim 28, wherein the apparatus has a complementary contact set comprising four complementary contacts, of which two complementary contacts are arranged to transfer supply potentials, and two further complementary contacts, which are connected to a write and read device of the apparatus via two lines, are arranged to transfer data signals and clock signals from the write and read device of the apparatus to a solid-state memory provided in a cassette adapted to be inserted into the apparatus, and a switching device is arranged in at least one of the two lines leading from the write and read device to the further complementary contacts for the transfer of data and clock signals, by which switching device the impedance provided as an indicator in a cassette adapted to be inserted into the apparatus can be connected to the detection device of the apparatus.

* * * * *

UNITED STATES PATENT AND TRADEMARK OFFICE
CERTIFICATE OF CORRECTION

PATENT NO.    : 6,078,480
DATED         : June 20, 2000
INVENTOR(S)   : Harmut Schandl, Dietfried Suss and Albert M.A. Rijckaert It is certified that error appears in the above-identified patent and that said Letters Patent is hereby corrected as shown below:

Column 24,
Line 34, change "a" to -- the --.

Column 26,
Line 40, after "resistor" add -- (R1) --;
Line 44, after "resistor" add -- (R2) --.

Signed and Sealed this

Twelfth Day of November, 2002

Attest:

Attesting Officer

JAMES E. ROGAN
Director of the United States Patent and Trademark Office